Dec. 29, 1959  W. D. WHITE  2,919,066
VECTOR ADDER SYSTEM
Filed Feb. 28, 1957
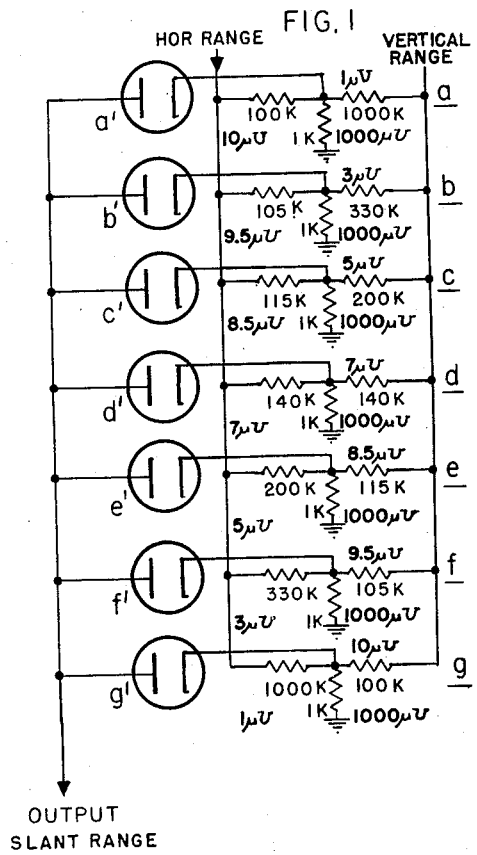
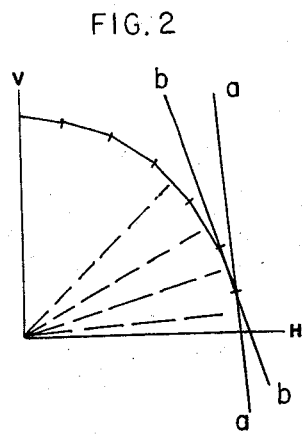
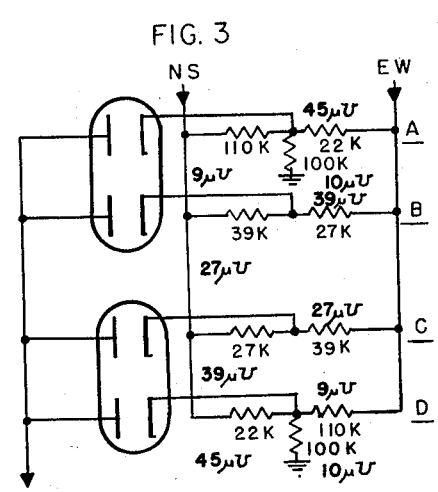
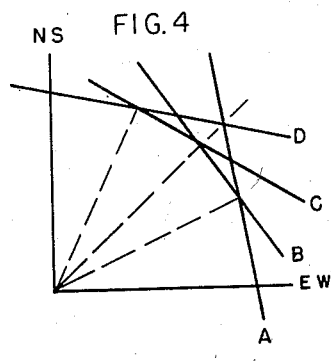
INVENTOR.
WARREN D. WHITE

United States Patent Office 2,919,066
Patented Dec. 29, 1959

2,919,066

VECTOR ADDER SYSTEM

Warren D. White, East Norwich, N.Y., assignor to the United States of America as represented by the Secretary of the Army Application February 28, 1957, Serial No. 643,206

3 Claims. (Cl. 235—192)

This invention relates to a simplified vector adder circuit capable of providing a D.C. output voltage equal to the vector sum of two D.C. input voltages by purely passive means.

Various electronic circuits require vector addition to give the magnitude of an output vector with varying degrees of accuracy; for example, in radar systems of some types the horizontal range and height are known and available as D.C. voltages and a further D.C. voltage equivalent to the slant range is desired. Also in radar P.P.I. displays it is sometimes desirable to suppress the cathode ray tube beam when the deflection is sufficient to displace the beam beyond the face of the cathode ray tube. Such a P.P.I. display is disclosed in the application of Abraham Shulman Ser. No. 642,630, filed February 26, 1957, now Patent No. 2,864,969. It is also disclosed in an article by the above Abraham Shulman in the May 1956 issue of "Electronics," pages 168 to 171, in which is described a P.P.I. radar system using the circuit claimed herein. This article also acknowledges that this circuit was derived from the applicant herein. The disclosures of the above application and article are hereby incorporated as part of the present application by reference.

In the circuit shown in said publication, only four diodes were used in the output of the vector adder circuit since only a rough approximation of the effective output curve of the adder to the edge of the cathode ray tube face was needed for the purpose there involved. However, by the use of only a few additional diodes the effective output of the vector adder can be made extremely close to the actual value of a true vector addition of the input voltages.

Also in the circuit as shown therein a fairly high voltage output was desired and therefore the circuits were shown as very lightly loaded. However, for purpose of analysis it has been found much easier to describe a circuit in which there is rather heavy loading to reduce the interaction between the various components and make it possible to analyze currents separately.

An object of this invention is to provide a simple passive circuit for the vector addition of D.C. voltages or simple A.C. voltages of the same phase.

Other objects of the invention will be apparent from the following description and accompanying drawings, in which:

Fig. 1 is a schematic circuit of a vector adder having D.C. inputs corresponding to horizontal range and height.

Figure 2 is a diagram of the voltage relations involved in the operation of the circuit of Figure 1.

Figure 3 is a schematic circuit of a simplified vector adder, and

Figure 4 is a diagram similar in nature to that of Figure 2 but indicating the voltage relations involved in the operation of the circuit of Figure 3.

In the circuit of Figure 1 the D.C. horizontal and vertical range inputs are supplied to a plurality of resistor networks $a$ to $g$ and each of such networks is connected to one of the output diodes $a'$ to $g'$. The resistor network $a$ is made most sensitive to horizontal and vertical range voltages corresponding to an elevation angle of approximately 6°, the circuit $b$ most sensitive to values corresponding to an elevation angle of approximately 19° and so on for increasing odd multiples of the angle $\pi/4$ divided by the number of resistor networks.

For greatest convenience in analysis the conductance in micromhos as well as the resistance in ohms of the various resistors are indicated in the drawing, the symbol "K" (used only in designating resistance) representing the number 1000. Thus 100K indicates a 100,000 ohm resistor, etc. The output of all the circuits is loaded by a 1000 ohm resistor (1K) and the respective currents from the horizontal and vertical range inputs are made substantially proportional to the sine and cosine respectively of the angles to which the networks are intended to be most sensitive. Therefore, as shown in the drawing the horizontal range voltage is applied to the load resistor 1K thru a resistor shown as 100K and the vertical voltage thru a resistor shown as 1000K. Therefore, the output voltage across the load resistor will be equal to approximately 0.0099 of the horizontal range voltage plus 0.001 of the vertical voltage. Similarly, in the network $b$ the resistors 105K and 330K (of conductance 9.5 had and 3.0 micromhos) would provide in the output circuit the voltage proportional to 0.0095 of the horizontal range voltage and 0.003 of the vertical voltage. The resistor networks $c$ to $g$ may be similarly analyzed and it will be apparent that the last three networks are mirror images of the first three but applied to the opposite input leads. Analysis will show that the conductance values of these resistors are approximately proportional to the sine and cosine of the angles to which the networks are most sensitive.

For reasons of efficiency the resistor networks would not actually be so heavily loaded, but with a lesser loading the interaction between the horizontal and vertical range voltages becomes greater. Since diodes are not exactly of zero resistance to one polarity and infinite resistance to another polarity, their loading effect may also be considered and by proper design may even be used to assist in establishing a very precise vector addition in the circuit as shown.

In Figure 2 the line $a$ represents the effect of the network $a$ in producing a predetermined output slant range voltage with various values of horizontal range input voltage and height input voltage. Similarly, the line $b$ represents the effect of the network $b$ in producing the same output slant range voltage with varying values of range and height voltage and so on for the other resistor networks.

It will be clear that the output voltage will vary substantially in accordance with the vector sum of the inputs through a wide range of values, although the diagrams of Figs. 2 and 4 are based on the inputs required to produce a particular output, the specific use considered in the Shulman system.

Due to the action of the diodes $a'$ to $g'$ the actual output voltage corresponding to a particular slant range is obtained from that network $a$ to $g$ which most nearly corresponds to the actual elevation angle established by the range and height voltage values. Although the diodes supply the highest voltage to the output circuit, the diagram of Figure 2 is based on the lowest values of range and height which can establish the predetermined output slant range voltage. Therefore, the innermost portions of the various lines $a$ to $g$ establish the ultimate effect on the vector adder circuit. As will be seen from the diagram, the figure would be a 90° sector of a polygon having seven sides in this 90° portion. For all practical purposes, this is substantially an arc of a circle. Furthermore, the imperfections of the diodes used frequently lead to current flowing thru more than one diode at a time particularly at the transition points corresponding to the corners of the polygon and therefore even the corners are partially clipped off to provide an even closer approach to a true circle. It will be apparent that the number of resistor networks and diodes may be modified to suit any particular application of the invention. Ordinarily the sine and cosine values to be used in computing the resistor values for the networks would be based on successive odd multiples of the angle $\pi/4$ divided by the number of rectifiers used in the output circuit. As shown in Figure 3, only four resistor networks and output diodes are used to obtain an approximate 90° arc with a rather substantial voltage output. In this system no loading resistor has been used on the innermost resistor networks of the system and the loading on the outer networks is rather light. The resistor values as used in the system of the above cited publication are shown in Figure 3. These values are also expressed in terms of conductance units, for example, micromhos.

It will be apparent that the basic networks each involve three resistors. These alternatively may be considered as conductors and the values may vary through a wide range, sometimes even zero conductance or infinite resistance, as the output resistors of networks B and C in Fig. 3. It is also clear that the diode polarity should be appropriate to the input voltages and the output circuits to be used. The term "highest voltage" is used in the absolute sense, ignoring polarity.

It will be noted in this circuit that the output voltage from resistor network A is nearly equal to the EW voltage component and the output of network D nearly equal to the NS voltage component rather than a very small percentage of the component voltages, as in the circuit of Figure 1. However, the various resistor networks connected between the NS component input and EW component input carry substantial currents from one input to the other and make it much more difficult to analyze the relation of all the currents involved in the system. Since this four diode network is only intended to produce an approximation of a circular arc there is no particular significance to any possible rounding of the corners of the polygon involved in the diagram of Figure 4. By expressing the values in terms of conductance it will be apparent that the values of conductances connected to the input are proportional both to the currents and to the sine and cosine of the angles and that there is a substantially constant sum of conductances in each network (corresponding to the network conductance as seen from the output, in Fig. 1 predominately the conductances of 1000 micromhos).

Preferred embodiments of the invention have been described, but many variations will be apparent to those skilled in the art.

I claim:
1. An adding system for a pair of varying D.C. voltage sources, said sources supplying voltages proportional to vectors along two rectangular coordinates, said system comprising a plurality of resistance networks connected in parallel to said sources, each network comprising a first resistance having one terminal connected to one source, a second resistance having one terminal connected to the other source, a third resistor having one terminal connected to the other terminals of said first and second resistors, the first resistors of successive networks having successive values proportional to the sines of successively increasing angles determined by different values of said vectors, the second resistors of said successive networks having successive values proportional to the cosines of said angles, and a common utilization circuit connected across the third resistors of all of said networks, said utilization circuit including a plurality of diodes all conducting in the same direction and respectively connected in series with the voltage drops provided by said third resistors.

2. An adding system as set forth in claim 1, wherein the third resistor in each network is small compared to the first and second resistors.

3. A system for combining a pair of voltages varying relative to a reference potential, providing an output resolvable into a plurality of linear functions the largest of which corresponds substantially to a desired nonlinear function, comprising a plurality of resistance networks connected in parallel to said varying voltages and to first and second common output terminals, each network comprising a pair of input resistors connected in series across said pair of voltages, a further output load resistor connected from a point between said pair of resistors to said first output terminal, and a diode connected from said point to said second output terminal, said diodes being conductive to cause said second output terminal to assume a potential corresponding to the maximum of said linear functions of said voltages, each pair of input resistors being proportioned to establish the slope and the load resistor being proportioned to such input resistors to establish the amplitude of the linear function to be generated thereby, successive networks varying progressively in slope and amplitude to correspond to portions of said non-linear function, whereby said networks individually establish predetermined linear functions of said voltages and said diodes connect the largest of said voltages to said output control circuit.

References Cited in the file of this patent

Electronic Analog Computers (Korn et al.), 1952, p. 11.

IRE Convention Record (Part 4) (Meissinger), 1955, p. 150–161.

Proc. of the IEE (Burt et al.), June 1955.